No. 753,442. PATENTED MAR. 1, 1904.
J. D. STEWART.
COMBINED DRAY SEAT AND TRUCK.
APPLICATION FILED JULY 25, 1903.
NO MODEL.

WITNESSES:

INVENTOR
John D. Stewart,
By Hubert D. Lawson
Attorney

No. 753,442.

Patented March 1, 1904.

UNITED STATES PATENT OFFICE.

JOHN D. STEWART, OF LAPORTE, INDIANA.

COMBINED DRAY-SEAT AND TRUCK.

SPECIFICATION forming part of Letters Patent No. 753,442, dated March 1, 1904.

Application filed July 25, 1903. Serial No. 166,944. (No model.)

*To all whom it may concern:*

Be it known that I, JOHN D. STEWART, a citizen of the United States, residing at Laporte, in the county of Laporte and State of Indiana, have invented new and useful Improvements in a Combined Dray-Seat and Truck, of which the following is a specification.

My invention relates to new and useful improvements in combined dray seats and trucks, and its object is to provide a seat for a dray which can be readily detached and used as a truck.

A further object is to so construct the seat as to permit the wheels connected thereto to contact with the ground only when the device is raised out of horizontal position.

A further object is to provide a seat which when used as a truck can be slid upon stairs or other irregular inclined surfaces, thereby preventing the pounding which ordinarily occurs when moving a truck over a surface of this character.

With the above and other objects in view the invention consists in the novel construction and arrangement of parts hereinafter more fully described and claimed.

Figure 1:
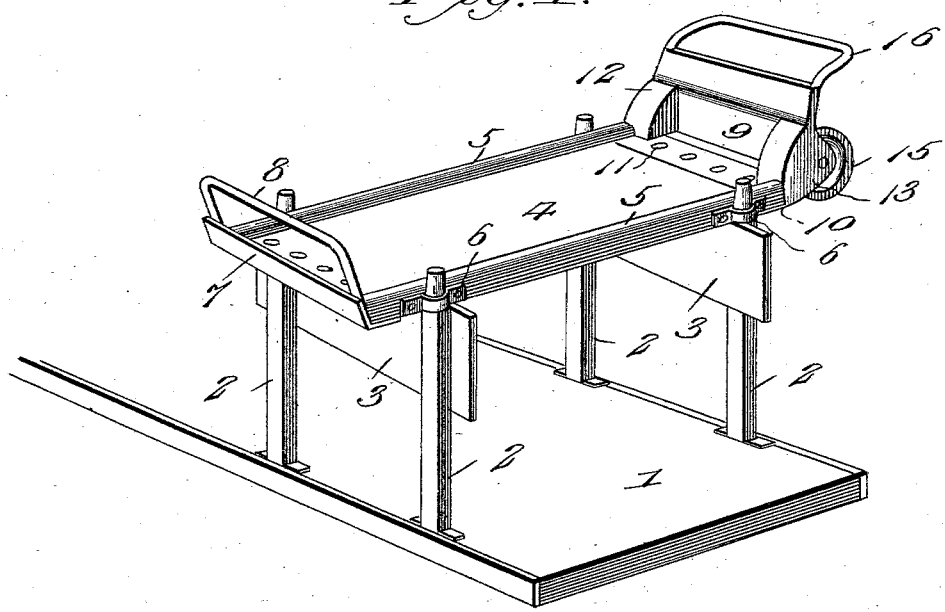
Figure 2:
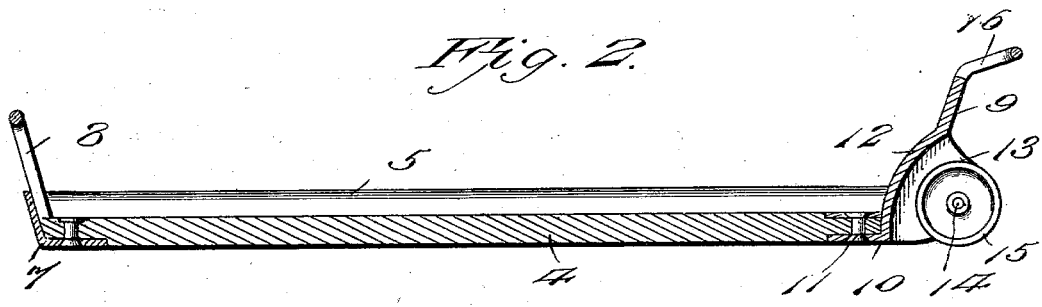
Figure 3:
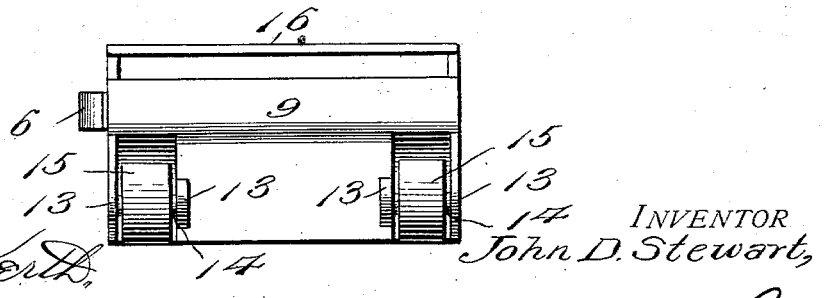

In the drawings, Figure 1 is a perspective view showing a seat in position upon a dray. Fig. 2 is an enlarged longitudinal section through the seat. Fig. 3 is an end view thereof.

Referring to the figures by numerals of reference, 1 is the body of a dray having standards 2 detachably connected to the sides thereof and having cross-strips 3 fastened thereto. These cross-strips serve to support the seat of the dray, which is formed of a body-portion 4, having ribs 5 along the side edges thereof. Straps 6, of sheet metal or any other suitable material, are connected to one of the sides of the body 4 and are adapted to be engaged by the standards 2, so as to be retained in proper position on the cross-strips 3. One end of the seat is provided with an upwardly-turned sheet-metal strip 7, to which is secured a handle 8, preferably constructed of metal and bail-shapad in form. To the other end of the body 4 is fastened a casting 9, having an inwardly-extending flange 10, which is secured to the body by means of rivets 11. Boxes 12 are formed integral with this casting at the sides of the body and have ears 13 extending therefrom, within which are secured pins 14. These pins serve as bearings for wheels 15, and the peripheries of these wheels do not extend below the plane of the bottom surface of the seat. A bail-shaped handle 16 is formed with or secured to the upper edge of casting 9 and is inclined outwardly therefrom.

It will be seen that when this device is in position upon a dray it forms a durable seat, having handles 8 and 16 at opposite sides thereof. When it is desired to remove articles from the dray and convey them to a desired point, it is merely necessary to raise the seat so as to detach the straps 6 from the standards 2, and said seat can then be used as a truck by placing the articles thereon and inclining the body 4 so as to bring the wheels 15 in contact with the ground. Where it is desired to move the truck upon an irregular inclined surface, the same can be slid thereon, and the wheels 15 will not pound, as is the case where ordinary trucks are employed. I attach importance to the construction of the casting used in connection with the seat, as the same renders the device very durable and inexpensive.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of my invention.

Having thus fully described the invention, what is claimed as new is—

1. A seat for drays comprising a body, standard-engaging straps thereon, handles at the ends of the seat, a casting secured to the body adjacent to one of the handles, boxes integral with the casting, and wheels journaled within the boxes and having their peripheries in alinement with one face of the body.

2. A seat for drays comprising a body, straps connected thereto, a handle at one end of the body, a casting at the other end, a flange to the casting extending under the body, means for securing the flange to the body, a handle extending from the casting, boxes integral with the casting, pins therein, and wheels journaled upon the pins and having portions of their peripheries in alinement with one face of the body.

In testimony whereof I have signed my name to this specification in the presence of two subscribing witnesses.

JOHN D. STEWART.

Witnesses:
F. H. RICHTER,
GUST JOHNSON.